July 19, 1966 E. H. YONKERS 3,261,954
CURRENT INTERRUPTION AND SEPARATION ELECTRODE STRUCTURE
FOR VACUUM SWITCHING APPARATUS
Filed Jan. 11, 1965 5 Sheets-Sheet 3

INVENTOR:
EDWARD H. YONKERS
BY Mason, Kolehmainen
Rathburn and Wyss
ATTORNEYS

INVENTOR:
EDWARD H. YONKERS
BY Mason, Kolehmainen,
Rathburn and Wyss
ATTORNEYS

United States Patent Office 3,261,954
Patented July 19, 1966

3,261,954
CURRENT INTERRUPTION AND SEPARATION ELECTRODE STRUCTURE FOR VACUUM SWITCHING APPARATUS
Edward H. Yonkers, Glencoe, Ill., assignor to Joslyn Mfg. and Supply Co., Chicago, Ill., a corporation of Illinois
Filed Jan. 11, 1965, Ser. No. 425,684
8 Claims. (Cl. 200—144)

The present application is a continuation-in-part of my copending application Serial No. 183,136, filed March 28, 1962, now abandoned.

The present invention relates to electric switching apparatus and circuit interrupting devices, and more particularly to such devices which operate within an evacuated envelope and are capable of making and breaking circuits carrying alternating currents in the range of magnitudes encountered in electric power applications.

This application is an improvement of the switching apparatus disclosed in my copending application Serial No. 847,241, filed October 19, 1959, now abandoned, and assigned to the same assignee as the present invention.

It has been found that initial separation of current carrying electrodes in a vacuum produces a short molten bridge of metal, for example, of the order of one millimeter in length, formed with a cross section in proportion to the current passing at the time. As the separation elongates the bridge, its temperature rises beyond the boiling point of the metal and it explodes blasting vapor and molten particles out into the evacuated space between the electrodes. This explosive action squashes the molten metal causing the formation of a concave pit on each electrode at the sites of the bridge ends. The squashed metal solidifies around the edges of the pits leaving small sometimes sharp irregularities projecting from the surfaces of the electrodes. In the case of separations occurring during the passage of current of the order of 3,000 amperes between tungsten electrodes such projections may become heated and act as thermionic emitters which, if they develop on both electrodes, prevent the interruption of current.

After the separation of the electrodes has become sufficient to break the bridge, current will continue to flow between the electrode surfaces through the development of points of field emission on the cathode surface. These so called cathode spots are able to conduct only a limited amount of current in the range of 40 to 50 amperes; hence the number of such spots present on the cathode at any instant will be roughly proportional to the magnitude of the current at that time. These spots are mobile and move about at speeds of the order of 10 meters per second behaving somewhat as though they were repelled by one another. The exact mechanism of this cathode activity in a vacuum discharge has not been fully explained as yet. At any rate, this spreading and continuous motion of the cathode spots prevents the overheating of any small region and thus prevents the formation of a metallic arc or plasma and if the electrode surfaces are large enough for such spread and mobility to take place there appears to be no limit to the magnitude of current which could be interrupted in a vacuum.

The limitation in the performance of present dual contact designs comes from the excessive melting and distortion of electrode surfaces when they are called upon to separate while high currents are flowing. Such electron distortion prevents the normal cathode spread and mobility and leads to the formation of hot projections which restrike the discharge or cause continuous conductivity so that interruption does not occur as current passes through zero.

It has heretofore been proposed to provide a vacuum switch with a pair of subsidiary arc separating electrodes of a refractory material of high work function, and to provide a pair of main electrodes of lower work function to interrupt the arc. However, the lower work function permits field emission between the electrodes at a lower voltage.

Accordingly, it is an object of the present invention to provide vacuum switching and circuit breaking apparatus, which overcome the aforementioned difficulties.

A further object of the present invention is to provide an improved vacuum switching and circuit breaking apparatus capable of handling substantial amounts of alternating current at power distribution and transmission voltages.

A still further object of the present invention is to provide an improved vacuum switching apparatus which is not subjected to rapid deterioration when called upon to interrupt large currents at high voltages.

A further object of the present invention is to provide an improved vacuum switching and circuit breaking apparatus in which the current arc is separated by a first pair of electrodes and is thereafter interrupted by a second pair of electrodes.

Further objects and advantages of the invention will become apparent as the following description proceeds and the features of novelty which characterize the invention will be pointed out with particularity in the claims annexed to and forming a part of this specification.

The foregoing and other objects of the invention are realized by providing a vacuum contact device capable of handling higher currents more effectively and with two sets of electrode surfaces, one for separation and a second having extended surfaces for the spread of cathode spots for interruption of the arc. The separation electrodes act within an inner metal chamber so that molten metal does not escape and distort the surfaces of the interruption electrodes. The separation electrodes are relatively movable and may be separated in the separation chamber.

In one embodiment the movable one of the separation electrodes is rapidly withdrawn from the separation chamber and into a cavity in the opposite interruption electrode. After the molten metal bridge is exploded in the chamber, the cathode spots form around the negative member of the separating electrodes and quickly transfer to the extended surfaces of the interruption electrodes. This moves the separation electrodes out of the discharge and with their wise separation and shielded locations they are no longer involved in the interruption phenomenon. Thus, irregularities on their surfaces no longer cause limitation in current rating. The interruption electrode surfaces therefore remain smooth and effective for normal cathode spot formation, spread and interruption. The roving cathode spots cause only microscopic erosion or etching which seems to be beneficial in allowing free mobility and even distribution of the cathode spots as they are called upon to increase in number with the changes in current magnitude. In a preferred embodiment of the present invention, the interruption electrodes are relatively fixed in confronting relation at a predetermined spacing. In a further embodiment of the invention the interruption electrodes are relatively movable and provide additional current carrying paths parallel to the path of separation when the switch is closed.

In yet other embodiments of the invention the separation of the separation electrodes takes place entirely within the separation chamber, with the discharge then transferring to the extended interruption electrodes. Advantageously the explosion of the molten metal bridge formed between the separation electrodes is entirely confined to the separation chamber where its destructive effects are minimized.

The nature of the invention will best be understood when described in connection with the accompanying drawings in which.

Figures 1, 2, 3:
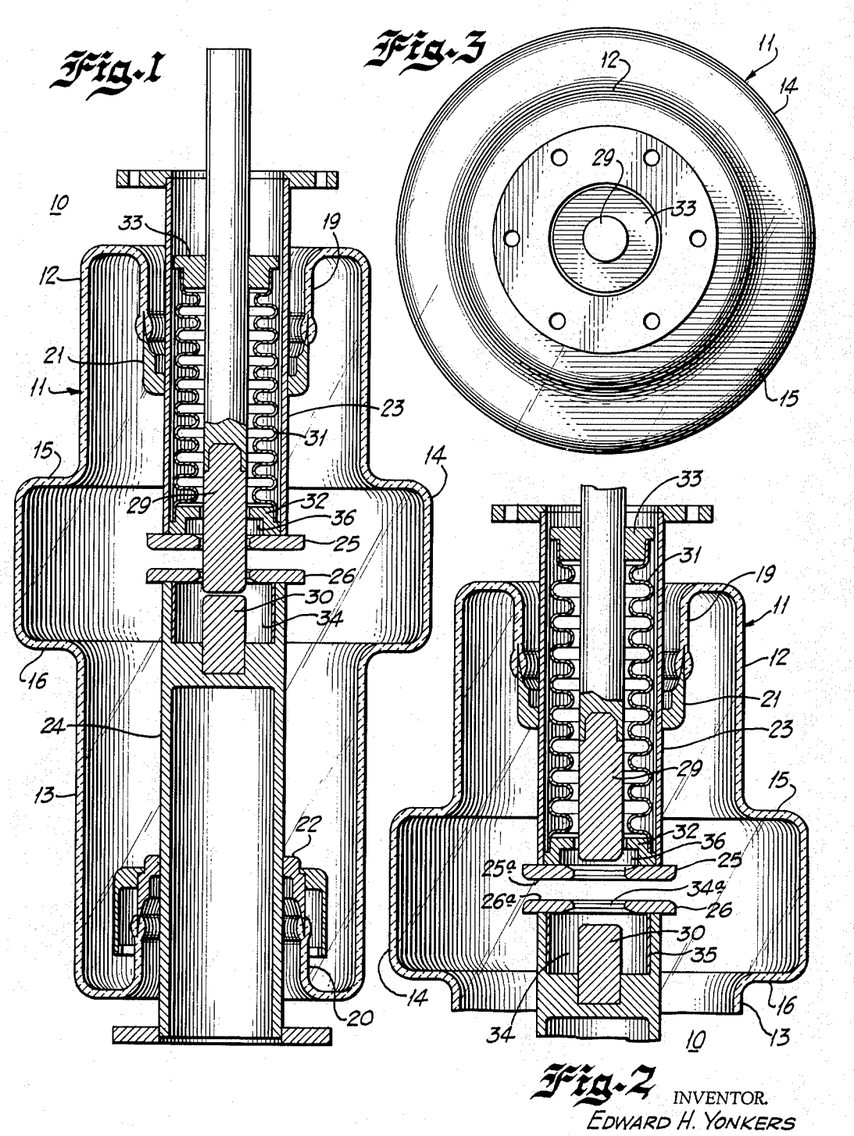
FIGURE 1 is an elevational cross sectional view of an improved vacuum switching apparatus according to the present invention and illustrated in a closed position.
FIGURE 2 is an elevational sectional view of the vacuum switching apparatus illustrated in FIGURE 1 and shown in an open position.
FIGURE 3 is a top plan view of the improved vacuum switching apparatus according to FIGURE 1.

Referring now to the embodiments of FIGURES 1, 2 and 3, a circuit-breaking vacuum switch 10 embodying the present invention is shown as comprising a dielectric evacuated envelope 11, which is preferably formed of glass and which comprises a pair of cylindrical end portions 12 and 13 and an intermediate annular portion 14 of larger diameter than the end portions 12 and 13 and which is connected at the end by a pair of integral transverse wall portions 15 and 16 so that the portions 14, 15 and 16 define an abrupt annular trough forming a vapor confining portion, as more fully described in my above mentioned copending application. The end portions 12 and 13 are each respectively curved inwardly along the axis at the ends thereof terminating in integral flange portions 19 and 20 respectively. The flange portions 19 and 20 each carry a suitable metallic sealing member 21 and 22 respectively which are joined to the flange by fusion, as is well known to those skilled in the arts; the members 21 and 22 being formed of any one of a number of known metal alloys having a coefficient of expansion substantially equal to that of the particular type of glass employed.

A pair of hollow tubular conductive members or electrode supports 23 and 24 extend through respective ends of the switch 10 and are sealed to the respective sealing members 21 and 22 in any suitable manner, such as by brazing. The inner end of the electrode supports 23 and 24 support interrupter electrodes or surfaces 25 and 26, respectively, having extended arcing surfaces 25a and 26a, of refractory material of high work function such as tungsten. The interrupter electrodes 25 and 26 are in the form of thin annular discs concentric with and normal to the axis of the electrode supports 23 and 24 and fixedly spaced apart by a predetermined distance and present the substantially flat, parallel confronting arcing surfaces 25a and 26a.

In order to provide for separation of an arc between the electrode supports 23 and 24, there is provided a pair of relatively movable separation electrodes 29 and 30 of refractory material of high work function, such as tungsten. The separation electrodes 29 and 30 are concentrically positioned axially with respect to the electrode supports 23 and 24 and the interrupter electrodes 25 and 26. Moreover one of the separation electrodes 30 is fixedly secured to the electrode support 24 while the other of the separation electrodes 29 is movably positioned relative to the electrode support 23.

The movement of the electrode 29 is accomplished through a metallic bellows 31 which is brazed or otherwise secured to a static fitting 32 connected in airtight relation to the electrode support 23 and electrode 25 and to a movable fitting 33 fixed to the movable separation electrode 29. In this manner the separation electrodes 29 and 30 may be relatively moved within the envelope 11 while maintaining the enveolpe 11 evacuated. The outside diameter of the movable fitting 33 serves as a centering guide within the electrode support 23 and further protects the bellows 31 from all but axial load.

In order to provide for the separation of the electrodes 29 and 30 in a confining chamber to provide for the collection of the molten metal discharged from the exploding bridge formed by separation of the electrodes, the electrodes 29 and 30 contact within a separation or arcing chamber 34 in axial abutment with each other. The separation chamber 34 is generally cylindrical, having an axial opening 34a formed through the interrupter electrode 36 to provide for the passage of the movable separation electrode 29 into the chamber. A thin cylindrical liner 35 of high refractory material, such as tungsten, is inserted in the separation chamber 34 in order to protect the electrode support 24 which may be of lower melting metal such as of copper, from the hot tungsten splash that occurs within the separation chamber 34 at the time of separation.

To provide for the withdrawal of the movable separation electrode 29 out of the arcing chamber 34 thereby to transfer the arc from the separation electrodes 29 and 30 to the interruption electrodes 25 and 26, the movable separation electrode 29 is rapidly withdrawn from the separation chamber 34 and retracted within a chamber 36 formed concentrically and behind the electrode 25 within the electrode support 23.

From the above described detailed description of the vacuum switch 10, its operation is believed clear; however, briefly, in operation the electrical circuit is made between the tungsten tips of the separation electrodes 29 and 30 within the separation chamber 34. Moreover, separation also takes place within the separation chamber 34 by the movement of the movable separation electrode 29 away from the fixed separation electrode 30 and the bridge explosion of molten metal described above throws out molten and vaporized tungsten metal against the refractory liner 35, within the separation chamber 34 only. Cathode spots now form on the negative interruption electrode 29 or 30 (depending on the direction of the current flow at that moment) and separation electrode 25 or 26; that is, cathode spots form on electrodes 26 and 30 when they are negative and on electrodes 29 and 25 when the polarity is reversed so that they are negative. However, once the movable separation electrode 29 is withdrawn into the chamber 36, as indicated in FIGURE 2, remaining cathode spot activity takes place on the opposing surfaces of the interrupter electrodes 25 and 26 depending upon which of these are negative. Then as the current passes through a current zero, the final interruption occurs.

It will be appreciated that sharp points or other irregularities produced on the ends of the separation electrodes 29 and 30 during separation do not interfere with the spread and free motion of the cathode spots normal for interruption of currents.

Since it has been observed that cathode spots tend to increase in number as the current increases and that they move rapidly tending to spread as though they were mutually repellant, this action causes them to readily transfer from the separation electrodes 29 and 30 to the larger areas provided by the interruption electrodes 25 and 26.

Figures 4, 5:
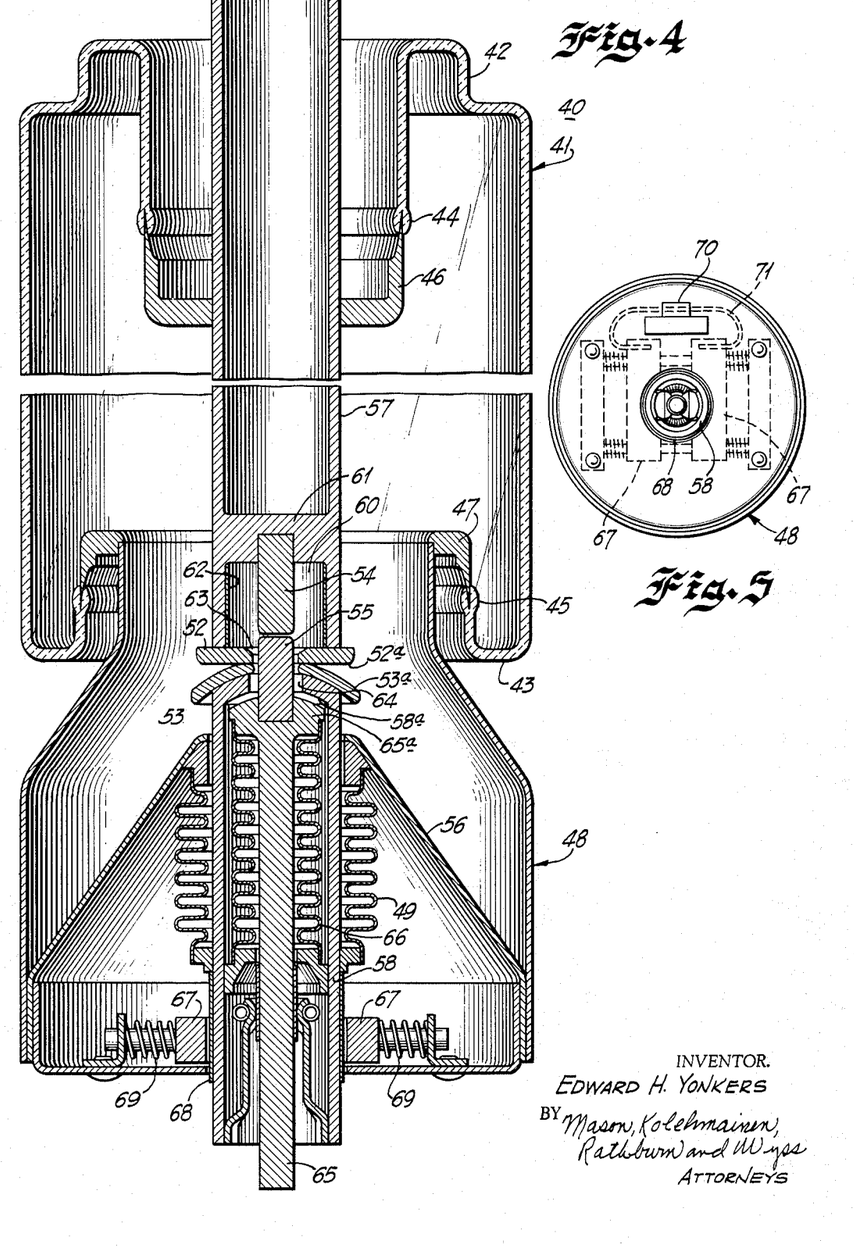
FIGURE 4 is a sectional elevational view of a modified vacuum switching apparatus according to the present invention.
FIGURE 5 is an end view of the modified vacuum switching apparatus of FIGURE 4.

Referring now to the modification of the circuit breaking vacuum switch illustrated in FIGURES 4 and 5, there is therein illustrated a vacuum switch wherein both the arc separation electrodes and the arc interrupter electrodes are relatively movable. Specifically, there is illustrated a modified vacuum switch 40 formed of a dielectric evacuated envelope 41 having a pair of end walls 42 and 43 each terminating in an internal flange portion 44 and 45, respectively. The flange portions 44 and 45 each carry a suitable sealing ring 46 and 47, respectively, which are joined to the flange portions 44 and 45, as heretofore described. One end of the evacuated envelope 40 is closed by a metal bell shaped housing or vapor confining portion 48 including a movable sealing member or bellows 49. The bellows 49 is completely protected from metal particles which may be ejected from a pair of relatively movable arc interrupter electrodes or surfaces 52 and 53 and from a pair of relatively movable arc separation electrodes 54 and 55 by a cone shaped metallic shield 56 having its enlarged outer end connected to the outer housing of the bell shaped vapor confining portion 48. The inner end of the shield 56 is closed by the bellows 49 to form a gas impervious envelope. As shown in FIGURE 4, one interrupter electrode 52 has a flat electrode surface 52a and the other interrupter electrode 53 has a spherical electrode surface 53a. The arc interrupter electrodes 52 and 53 and the arc separation electrodes 54 and 55 are preferably made of refractory material of high work functoin, such as tungsten, due to its high melting point and good conductivity; they may, however, be made of other suitable refractory conductors such as molybdenum. The enlarged section of the metal bell shaped portion 48 not only makes a strong mechanical coupling but further forms a vapor confining portion of the envelope which is insensitive to the metal particles which may come from the contact region and further acts as an electrostatic grating element to protect the metal-to-glass junction from deleterious corona effects and raises the external flash-over voltage of the device as a whole.

The arc interrupter electrode 52 is secured to the inner end of a hollow tubular electrode support or conductive member 57; the arc interrupter electrode 53 is movable into and out of contact with the arc interrupter electrode 52 and is positioned on the inner end of a hollow tubular electrode support or conductive member 58. It will be appreciated that the bellows 49 interconnects the shield 56 and conductive member 58 to permit the required motion of the conductive member 58 and the movable arc interrupter electrode 53 through expansion and contraction of the bellows 49. The electrode supports 57 and 58 may conveniently be made of copper.

In order to prevent splattering of molten metal from the molten metal bridge which is formed upon intial separation of current carrying electrodes, the separation electrodes 54 and 55 engage within a separation chamber 60 axially formed concentrically within the fixed support electrode 57. The fixed separation electrode 54 is secured to the fixed electrode support 57 through a cross wall 61 within the electrode 57 and the separation chamber 60 is formed within the electrode support 58 by the wall 61 and the fixed interrupter electrode 52, with a cylindrical side wall enclosed by a cylindrical liner 62 of refractory material such as tungsten. Initial separation of the arc separating electrode takes place within this separation chamber 60, the movable separation electrode 55 extending through an axially aligned opening 63 in the interrupter electrode 52. Moreover, in order to provide for transfer of the arc from the separation electrodes 54 and 55 to the interrupter electrodes 52 and 53, the movable separation electrode 55 is withdrawn into a chamber 64 formed in the movable electrode support 56 behind the movable interrupter electrode 53. The movable separation electrode 55 is movably supported by an electrode rod 65 and a bellows 66 forms a seal between the electrode rod 65 and the electrode support 58, thereby providing for relatively axial movement between the electrode rod 65 and the electrode support 58.

From the above detailed description, the operation of the modified vacuum switch is believed clear. However, briefly, it will be appreciated that the vacuum switch according to the embodiment of FIGURES 4 and 5 provides for engageable arc interrupter electrodes 52 and 53 as well as engageable arc separation electrodes 54 and 55, as indicated in FIGURE 4. Separation of the electrodes 52 and 53 is accomplished by an initial axial pull on the member 58; further axial pull of the member 58 is effective to separate the electrodes 54 and 55 through engagement of an undersurface 58a of the member 58 with an enlarged support portion 65a of the electrode rod 65. When it is desired to break the circuit closed by the switch 40 the arc interrupter electrodes 52 and 53 are first separated a predetermined distance and thereafter the arc separating electrodes 54 and 55 are separated. As heretofore described, initial separation of the arc separating electrodes 54 and 55 occurs within the separation chamber 60 so that initial vaporization of the electrode metal will collect on the refractory liner 62 in the chamber. Moreover, molten metal which is expelled when the molten metal bridge connecting the electrodes 54 and 55 explodes will likewise be collected on the refractory liner 62 and will not collect on the surfaces of the arc interrupting electrodes 52 and 53 to form irregularities therein. The electrodes 54 and 55 will be separated until the electrode 55 is withdrawn into the chamber 64 behind the interrupter electrode 53 and the arc which has initially been formed between the electrodes 54 and 55 will transfer to the arc interrupter electrodes 52 and 53 through cathode spot activity until the current passes through a current zero. When the current thereof passes through a current zero, the arc will extinguish itself.

It will be appreciated that because of the movable nature of the electrode support 58, provision must be made in order to provide for the electrical connection of the electrode support 58 through an external conductor. This is accomplished by the provision of fixed contacts or brushes of silver or similar high conducting material 67 slideably engaging a movable contact or surface 68 on the electrode support 58. The contacts 67 act as brushes and are biased into engagement with the contact surface 68 by a plurality of compression springs 69. The contact members 67 are electrically connected to a terminal member 70 by means of a pair of electrical conductors 71. Additionally brushes 72 carried by the conductive member 58 engage contact strips 73 on the electrode rod to provide a good electrical connection through the electrodes 54 and 55.

Figure 6:
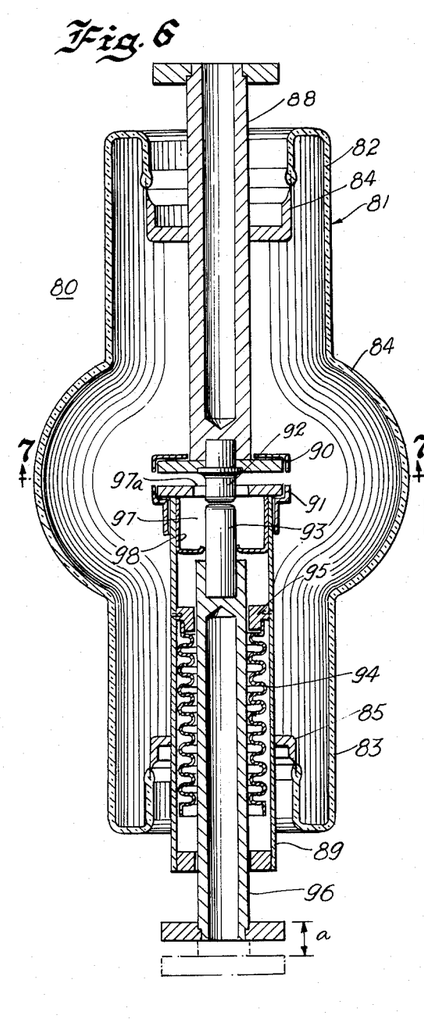
FIGURE 6 is an elevational cross sectional view of yet another embodiment of a vacuum switching apparatus according to the present invention wherein separation of the separation electrodes takes place entirely within the separation chamber.
Figure 7:
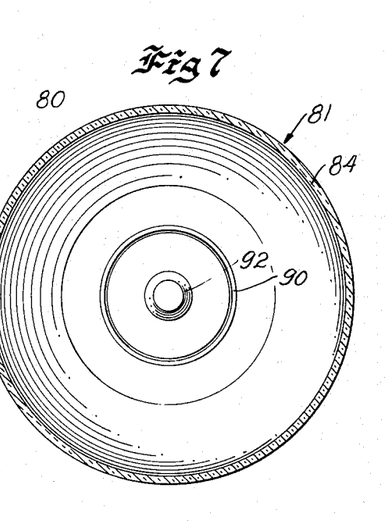
FIGURE 7 is a cross sectional view of the vacuum switching apparatus of FIGURE 6 taken along line 7—7 of FIGURE 6.

Referring now to the embodiment of FIGURES 6 and 7, there is illustrated a circuit-breaking vacuum switch 80 according to another embodiment of the present invention, and comprising a dielectric evacuated envelope 81 which may be formed of glass and which, if desired, may be similar in configuration to that heretofore described. However, as illustrated, the evacuated envelope 81 includes a pair of cylindrical end portions 82 and 83 connected by a somewhat spherical annular trough 84 forming a vapor confining portion. The respective ends of the envelope 81 are closed by suitable metallic sealing members 84 and 85, joined to the envelope by fusing, as is well known to those skilled in the art.

A pair of tubular conductive members or electrode supports 88 and 89 extends through respective ends of the switch 80 and are sealed to the respective sealing members 84 and 85 in any suitable manner, such as by brazing. The inner end of the electrode supports 88 and 89 carry interrupter electrodes 90 and 91 respectively in spaced apart, fixed relation of refractory material of high work function such as tungsten. The interrupter electrodes 90 and 91 are in the form of thin annular discs concentric with and normal to the axis of the electrode supports 88 and 89 and present substantially flat, confronting, extended arcing surfaces for the interruption of a discharge.

In order to provide for separation of an arc between the electrode supports 88 and 89, there is provided a pair of relatively movable separation electrodes 92 and 93 of refractory material of high work function, such as tungsten. The separation electrodes 92 and 93 are concentrically positioned axially with respect to the electrode supports 88 and 89 and the interrupter electrodes 90 and 91. Moreover one of the separation electrodes 90 is fixedly secured to its electrode support 88 while the other of the separation electrodes 93 is movably positioned relative to the electrode support 89.

The movement of the separation electrode 93 is accomplished through a metallic bellows 94 which is brazed or otherwise secured to a static fitting 95 connected in airtight relation to the electrode support 89, and having its other end secured in airtight relation to a movable fitting 96 carrying the movable separation electrode 93. In this manner the separation electrodes 92 and 93 may be relatively moved within the envelope 81 while maintaining the envelope 81 evacuated.

In order to provide for the separation of the electrodes 92 and 93 in a confining chamber to provide for the collection of the molten metal discharged from the exploding bridge formed by separation of the electrodes, the electrodes 92 and 93 contact within a separation or arcing chamber 97 in axial abutment with each other. The separation chamber 97 is generally cylindrical, having an axial opening 97a formed through the interrupter electrode 91 to provide for the positioning of the fixed separation electrode 92 extending into the chamber. A thin cylindrical cup shaped liner 98 of high refractory material, such as tungsten, is inserted in the separation chamber 97 in order to protect the electrode support 89 which may be of a lower melting metal such as of copper, from the hot tungsten flash that occurs within the separation chamber 97 at the time of separation.

In accordance with the present embodiment of the present invention, separation of the separation electrodes 92 and 93 takes place entirely within the separation chamber 97 thereby to completely confine the flash of molten metal which occurs from the exploding metal bridge. More specifically axial pull along the support member 96 will be effective to move separation electrode 93 away from the fixed separation electrode 92 to provide for establishment and elongation of an arc between the separation electrodes. Continued separation of the separation electrodes 92 and 93 will create an arc of sufficient length that the arc will then transfer, first between the fixed separation electrode 92 and the interruption electrode 91, and thereafter between the respective interruption electrodes 90 and 91, where the arc will be extinguished upon subsequent current zero in the line. It will be appreciated that the amount of separation, a, FIGURE 6, between the separation electrodes 92 and 93 must be sufficient to transfer the arc from the movable electrode 93. Moreover the opening 97a between the interruption electrode 91 and the separation electrode 92 must likewise be sufficiently large that the discharge will transfer to the space between the interruption electrodes 90 and 91 for extinguishment.

Figures 8, 9:
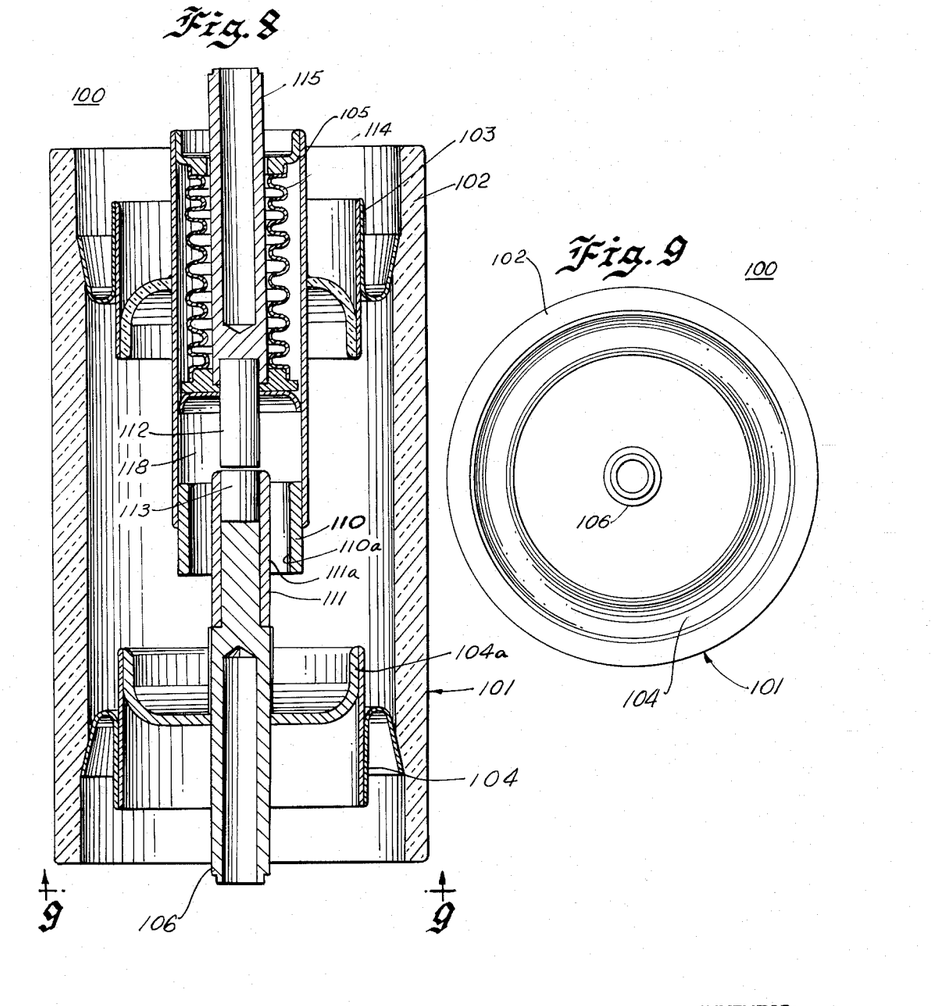
FIGURE 8 is a cross sectional elevational view of yet another embodiment of a vacuum switching apparatus according to the present invention.
FIGURE 9 is an end view of the modified vacuum switching apparatus of FIGURE 8, taken along line 9—9 of FIGURE 8.

Advantageously the elongation of the separation electrodes in the separation chamber permits various electrode geometry providing for confinement of the arc discharge during separation and interruption and permits use of suitable extended surfaces for the movable cathode spots after breaking of the melted metal bridge. FIGURES 8 and 9 illustrate the embodiment of the present invention wherein the interruption electrodes are concentric cylindrical surfaces. More specifically, as illustrated in FIGURES 8 and 9, there is shown a current-breaking vacuum switch 100 embodying the present invention and shown as comprising a dielectric evacuated envelope 101, including an outer cylindrical portion 102 formed of glass and sealed at its ends by suitable metallic sealing means 103 and 104.

Suitable conductive members or electrode supports 105 and 106 extend through respective ends of the switch 100 and are sealed to the respective sealing means 103 and 104 in any suitable manner, such as by brazing. The inner end of the electrode supports 105 and 106 carry interrupter electrodes 110 and 111 respectively, each having extended arcing surfaces 110a and 111a, of refractory material of high work function such as tungsten and fixedly spaced apart a predetermined distance. The interrupter electrodes 110 and 111 in the illustrated embodiment are in the form of concentric members and, more specifically, the interruption electrode 111 is in the form of a rod having the interruption surface 111a and extending coaxially within the cylindrical electrode 110 whose inner surface forms the interruption surface 111a.

In order to provide for separation of an arc between the electrode supports 105 and 106, there is provided a pair of relatively movable separation electrodes 112 and 113 of refractory material of high work function, such as tungsten. The separation electrodes 112 and 113 are concentrically positioned axially with respect to the electrode supports 105 and 106 and with respect to the interrupter electrodes 110 and 111. Moreover one of the separation electrodes 113 is fixedly secured to the electrode support 106 while the other of the separation electrodes 112 is movably positioned relative to the electrode support 105. More specifically the movement of the electrode 112 is accomplished through a metallic bellows 114 which is brazed or otherwise secured between the inner surface of the electrode support 105 and an additional conductive electrode carrier 115. In this manner the separation electrodes 112 and 113 may be relatively moved within the envelope 101 while maintaining the envelope 101 evacuated.

In order to provide for the separation of the separation electrodes 112 and 113 in a confining chamber to provide for the collection of the molten metal discharged from the exploding bridge formed by separation of the electrodes, the electrodes 112 and 113 contact within a separation or arcing chamber 118 formed within the cylindrical electrode support 105 between the interruption electrode 110 and the structure of the bellows 114. The separation chamber 118 is generally cylindrical and is terminated at one end by the axial opening in the electrode 110 through which the fixed separation electrode 113 extends.

Separation of the separation electrodes 112 and 113 takes place entirely within the arcing chamber 118 and, more specifically, axial movement of the electrode holder 115 is effective to move the separation electrode 112 apart from the separation electrode 113 to form and elongate an arc discharge between the electrodes. Continued movement of the electrode 112 apart from the separation electrode 113 will cause the arc to transfer to the interruption electrodes 110 and 111. It will be appreciated that the elongation of the arc between the separation electrodes 112 and 113 must be sufficiently great to effect the transfer of the arc to the gap formed between the interruption surfaces 110a and 111a.

Advantageously according to the embodiment of FIGURES 8 and 9, separation and explosion of the molten metal bridge takes place entirely within the confined separation chamber 118, and transfer of the arc will occur between the fixed spaced apart interruption electrodes 110 and 111. The cathode spots which form between the electrodes 110 and 111 will disappear when the current passes through zero in the phase cycling of the vacuum interrupter 100. Moreover any splash which takes place from the interruption surfaces will be directed against a lower metallic shield 104a where metallic deposits may be collected without damage to the dielectric properties of the envelope 100.

Figure 10:
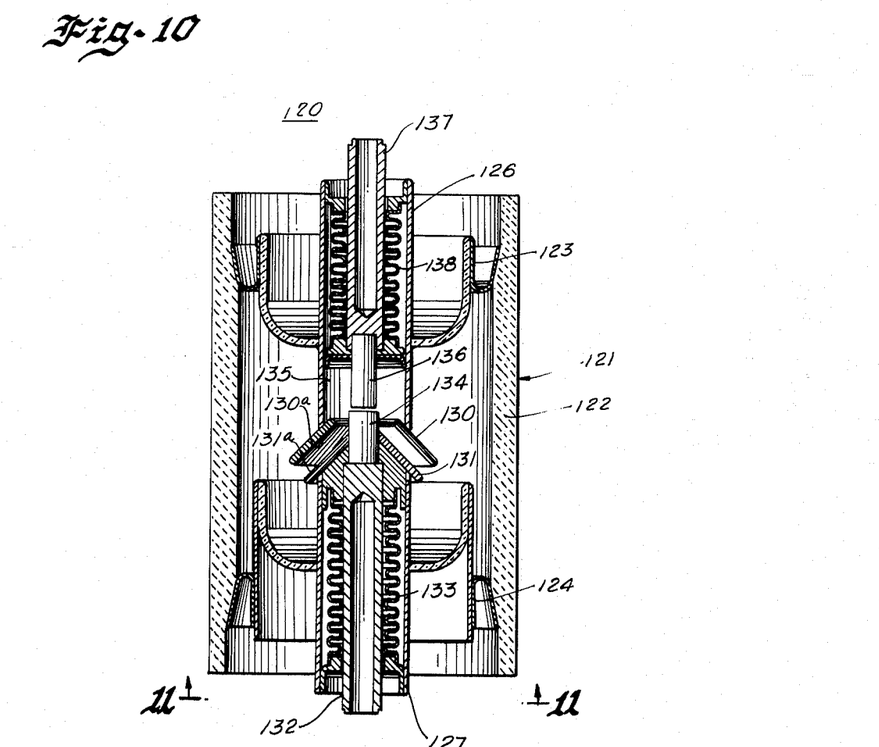
FIGURE 10 is a cross sectional elevational view of yet another embodiment of a vacuum switching apparatus according to the present invention.
Figure 11:
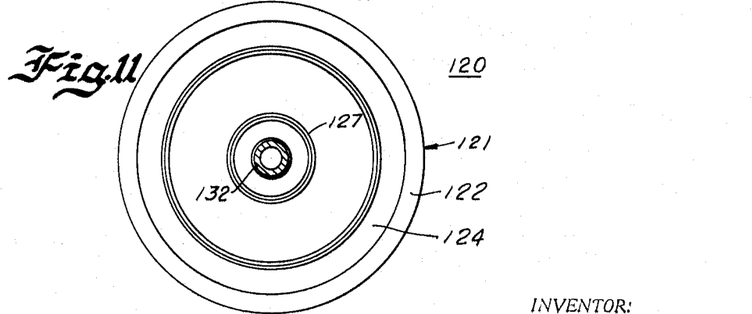
FIGURE 11 is an end view of the vacuum switching apparatus of FIGURE 10, taken along line 11—11 of FIGURE 10.

Referring now to the modification of the circuit-breaking vacuum switch illustrated in FIGURES 10 and 11, there is illustrated a vacuum switch wherein both the arc separation electrodes and the arc interrupter electrodes are relatively movable, in similar manner to the embodiment of FIGURES 4 and 5, and additionally wherein the separation of the arc separation electrode takes place entirely within the confining chamber. More specifically there is illustrated a modified vacuum switch 120 having a dielectric evacuated envelope 121 similar to that heretofore described in connection with the embodiment of FIGURES 8 and 9 and including a cylindrical dielectric outer member 122 closed by suitable end sealing means 123 and 124. A pair of opposed electrode supports 126 and 127 of hollow cylindrical form extend through respective ends of the vacuum switch 120 and are sealed to the sealing means 123 and 124 respectively. One of the electrode supports 126 fixedly carries a conically shaped interruption electrode 130 at its inner end, and the other of the electrode supports 127 guides a movable interruption electrode 131 of conical shape supported adjacent its inner end by an electrode carrier 132. The conically shaped confronting interruption electrodes 130 and 131 provide generally parallel, extended arcing surfaces 130a and 131a. The electrode carrier 132 is supported in movable relation to the electrode support 127 through a metallic sealing bellows 133 in like manner as heretofore described. As clearly illustrated in FIGURE 10, the apex of the interruption electrode 130 is cut off so as to provide a somewhat frustrum shaped conical electrode and the movable electrode carrier 132 additionally supports a separation electrode 134 at its inner end extending through the apex of its associated separation electrode 131 and further extending through the opening in the electrode 130 into a separation chamber 135. Additionally a movable separation electrode 136 is supported on an electrode carrier 137 and extends into the separation chamber 135. The electrode carrier 137 is sealed in airtight relation to the electrode support 126 through a bellows 138 in a manner heretofore described. The separation chamber 135 is formed within the hollow electrode support 126 between the interruption electrode 130 and the structure associated with the bellows 128.

From the above detailed description, the operation of the modified vacuum switch according to the embodiment of FIGURES 10 and 11 is believed clear. However, briefly, it will be appreciated that the vacuum switch according to the embodiment of FIGURES 10 and 11 provides for engageable arc interruption electrodes 130 and 131 as well as engageable arc separation electrodes 134 and 136. Separation of the interruption electrodes 130 and 131 is accomplished by an initial axial pull on the electrode carrier 132 to provide spaced apart interruption electrodes. Further axial pull on the electrode carrier 137 is effective to further separate the separation electrodes 134 and 136. It will be appreciated that separation of the separation electrodes 134 and 136 will initiate an arc discharge therebetween, and the arc discharge will subsequently transfer to the extended surfaces 130a and 131a formed between the confronting areas of the interruption electrodes 130 and 131. Moreover it will be appreciated, as heretofore described, that although the arc separation takes place entirely within the separation chamber 135, the arc will readily transfer from the separation electrodes 134 and 136 to the interruption electrodes 130 and 131. The separation of the electrodes 134 and 136 must be sufficiently large to cause transfer of the arc discharge, first between the electrodes 134 and 130, and then between the electrodes 130 and 131 where it will be extinguished when the switch passes through a current zero condition.

Although the present invention has been described in conjunction with preferred embodiments thereof, it is obvious that numerous other embodiments may be devised by those skilled in the art. It is therefore intended in the appended claims to cover all such modifications as fall within the true spirit and scope of this invention.

What is claimed as new and desired to be secured by Letters Patent of the United States is:

1. A vacuum switching apparatus comprising a dielectric evacuated envelope, a pair of confronting current interruption electrodes in said envelope having confronting faces defining extended arcing surfaces, said current interruption electrodes being fixed in predetermined spaced apart relation, and a pair of relatively movable arc separation electrodes in said envelope proximately positioned to said interruption electrodes and movable between a closed position and an open position wherein each of said separation electrodes lies behind the confronting face of one of said interruption electrodes so that any arc initiated by said separation electrodes is transferred to the spaced apart interruption electrodes.

2. A vacuum switching apparatus comprising an evacuated envelope including an elongated dielectric portion and a metal bell shaped portion having a narrow end secured to one end of said dielectric portion and additionally including a cone shaped metallic shield extending inwardly from the outer end of said bell shaped portion, a pair of confronting current interruption electrodes in said envelope within said bell shaped portion thereof having confronting faces defining extended arcing surfaces and formed with axial openings, a first hollow conductive electrode support extending through the other end of said dielectric portion and fixedly supporting a first one of said current interruption electrodes, said electrode support being formed with an arc separation chamber behind the confronting face of said first one of said current interruption electrodes, a first arc separation electrode fixedly positioned in said arc separation chamber, a second hollow conductive electrode support extending concentrically through said cone shaped shield and movably supporting a second one of said current interruption electrodes for engagement with said first one of said current interruption electrodes, flexible sealing means interconnecting said second electrode support and said cone shaped portion, an electrode support extending through said second hollow conductive electrode support, a second arc separation electrode carried by the last mentioned support movable through said axial openings for engagement with said first arc separation electrode in said arc separation chamber, and flexible sealing means interconnecting said second electrode support and the last mentioned electrode support.

3. A vacuum switching apparatus comprising an evacuated envelope including an elongated dielectric portion and a metal bell shaped portion having a narrow end secured to one end of said dielectric portion and additionally including a cone shaped metallic shield extending inwardly from the outer end of said bell shaped portion, a pair of confronting current interruption electrodes in said envelope within said bell shaped portion thereof having confronting faces defining extended arcing surfaces, a first conductive electrode support extending through the other end of said dielectric portion and fixedly supporting a first one of said current interruption electrodes, a second conductive electrode support extending concentrically through said cone shaped shield and movably supporting a second one of said current interruption electrodes for engagement with said first one of said current interruption electrodes, flexible sealing means interconnecting said second electrode support and said cone shaped portion.

4. A vacuum switching apparatus comprising a dielectric evacuated envelope including an elongated dielectric portion and a metal bell shaped portion having a narrow end secured to one end of said dielectric portion and a larger bell end, first and second electrodes positioned for operation within said bell shaped portion, first conductive means carried by and extending through one end of said envelope for fixedly supporting said first electrode within said bell shaped portion, second conductive means carried by and extending through said bell end at the opposed end of said envelope for supporting said second electrode in face-to-face relation with said first electrode within said bell shaped portion, means for bringing said first and second conductive means into and out of electrical engagement, the facing surfaces of said electrodes being shaped to provide a gradually increasing gap length therebetween, said bell shaped portion being positioned to intercept and confine vaporized metal sprayed from the electrode during an arc discharge between the electrodes.

5. A vacuum switching apparatus as defined in claim 1 above wherein all of said electrodes are formed of tungsten.

6. A vacuum switching apparatus comprising an evacuated envelope including an elongated dielectric portion and a metal bell shaped portion having a narrow end secured to one end of said dielectric portion and additionally including a cone shaped metallic shield extending inwardly from the outer end of said bell shaped portion, a pair of confronting current interruption electrodes in said envelope within said bell shaped portion thereof having confronting faces defining extended arcing surfaces and formed with axial openings, a first hollow conductive electrode support extending through the other end of said dielectric portion and fixedly supporting a first one of said current interruption electrodes, said electrode support being formed with an arc separation chamber behind the confronting face of said first one of said current interruption electrodes, a first arc separation electrode fixedly positioned in said arc separation chamber, a second hollow conductive electrode support extending concentrically through said cone shaped shield and movably supporting a second one of said current interruption electrodes for engagement with said first one of said current interruption electrodes, flexible sealing means interconnecting said second electrode support and said cone shaped portion, an electrode support extending through said one of said hollow conductive electrode supports, a second arc separation electrode carried by the last mentioned support for engagement with said first arc separation electrode in said arc separation chamber, and flexible sealing means interconnecting said one of said hollow electrode supports and the last mentioned electrode support.

7. A vacuum switching apparatus comprising an evacuated dielectric envelope, a pair of confronting current interruption electrodes in said envelope having confronting faces defining extended arcing surfaces and in fixed relation relative to each other, a first conductive electrode support extending through one end of said envelope and fixedly supporting a first one of said current interruption electrodes, said electrode support being formed with an arc separation chamber behind the confronting face of said first one of said current interruption electrodes, said electrode support being formed with an arc separation chamber behind the confronting face of said first one of said current interruption electrodes, a second conductive electrode support extending through the other end of said envelope and fixedly supporting a second one of said current interruption electrodes, a first arc separation electrode positioned in said arc separation chamber, an electrode support proximately positioned to said conductive electrode support, a second arc separation electrode carried by the last mentioned support movable into engagement with said first arc separation electrode in said arc separation chamber, and flexible sealing means interconnecting the last mentioned electrode support and said envelope.

8. A vacuum switching apparatus comprising an evacuated dielectric envelope, a pair of confronting current interruption electrodes in said envelope having confronting faces defining extended arcing surfaces, a first conductive electrode support extending through one end of said envelope and fixedly supporting a first one of said current interruption electrodes, said electrode support being formed with an arc separation chamber behind the confronting face of said first one of said current interruption electrodes provided with a contact face, a first arc separation electrode fixedly positioned in said arc separation chamber, a second conductive electrode support extending through the other end of said envelope and supporting a second one of said current interruption electrodes, an electrode carrier proximately positioned to said conductive electrode supports, a second arc separation electrode carried by said electrode carrier having a contact face engageable with said first arc separation electrode in said arc separation chamber said contact faces being separable wholly within said separation chamber a distance sufficient to transfer an arc from said separation electrodes to said interruption electrodes, and flexible sealing means interconnecting the last mentioned electrode carrier and said envelope.

References Cited by the Examiner

UNITED STATES PATENTS

| 2,976,382 | 3/1961 | Lee | 200—144 |
| 3,014,110 | 12/1961 | Cobine | 200—144 |
| 3,026,394 | 3/1962 | Jennings | 200—144 |
| 3,071,667 | 1/1963 | Lee | 200—144 |

FOREIGN PATENTS

| 787,846 | 12/1957 | Great Britain. |
| 571,959 | 1/1958 | Italy. |
| 135,939 | 2/1961 | Russia. |

ROBERT K. SCHAEFER, *Primary Examiner.*

ROBERT S. MACON, *Examiner.*